United States Patent [19]

Seifert

[11] Patent Number: 4,817,792
[45] Date of Patent: Apr. 4, 1989

[54] INDIVIDUAL CONTAINER THAT CAN BE ASSEMBLED TO A MULTIPLE STORAGE CONTAINER

[75] Inventor: Josef Seifert, Grosselfingen, Fed. Rep. of Germany

[73] Assignee: Kurz Kunststoffe GmbH, Owingen, Fed. Rep. of Germany

[21] Appl. No.: 220,580

[22] Filed: Jul. 18, 1988

[30] Foreign Application Priority Data

Jul. 28, 1987 [DE] Fed. Rep. of Germany ....... 3724961

[51] Int. Cl.$^4$ .............................................. B65D 85/57
[52] U.S. Cl. .................................... 206/309; 206/444; 211/40; 211/41; 211/149
[58] Field of Search ............... 206/309, 444, 311, 387, 206/445, 449; 211/40, 41, 149

[56] References Cited

U.S. PATENT DOCUMENTS

| | | | |
|---|---|---|---|
| 3,592,344 | 7/1971 | Schade | 220/23 X |
| 3,933,268 | 1/1976 | Buske | 220/23 X |
| 4,496,050 | 1/1985 | Kirchner et al. | 206/44 X |
| 4,546,898 | 10/1985 | Ekuan | 206/444 |
| 4,684,017 | 8/1987 | Egly | 206/444 |
| 4,750,611 | 6/1988 | Morrone | 206/444 |
| 4,765,469 | 8/1988 | Seifert | 206/444 |

Primary Examiner—Joseph Man-Fu Moy
Attorney, Agent, or Firm—McAulay, Fields, Fisher, Goldstein & Nissen

[57] ABSTRACT

In connection with an individual container, which can be assembled with a pre-determined number of additional individual containers to form a multiple storage container, in particular a multiple filing box, it is proposed to subdivide each individual container into one front wall portion and one rear wall portion which are interconnected by links in such a manner that opening and closing kinematics similar to those of a parallelogram guide are obtained for each individual container, and that fixing means are provided on the respective rear and front faces of each individual container for connecting it safely, but detachably, to the associated rear or front face of the adjoining individual container whereby a multiple filing box is obtained that can be opened and closed in concertina-like mannner. The multiple filing box is composed of individual containers which form the transport and/or sales packing of the goods (CD disk, data storage means, or the like) accommodated in each individual container.

15 Claims, 3 Drawing Sheets

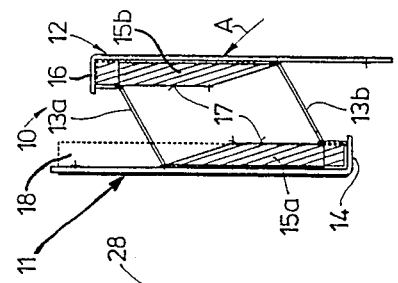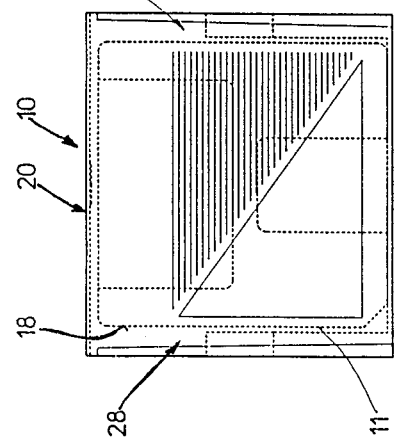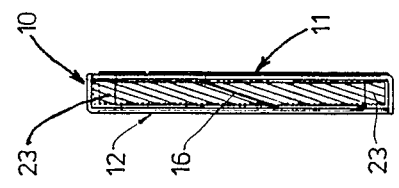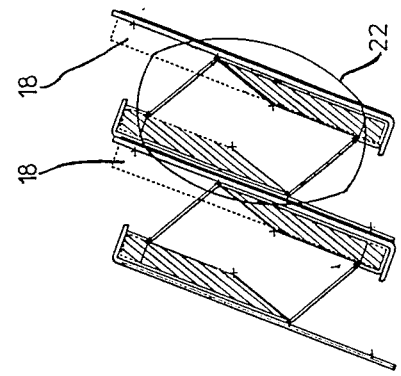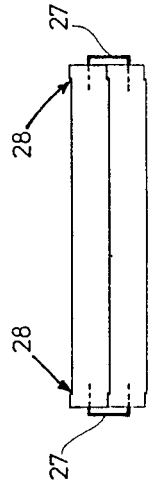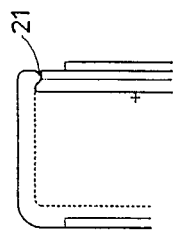

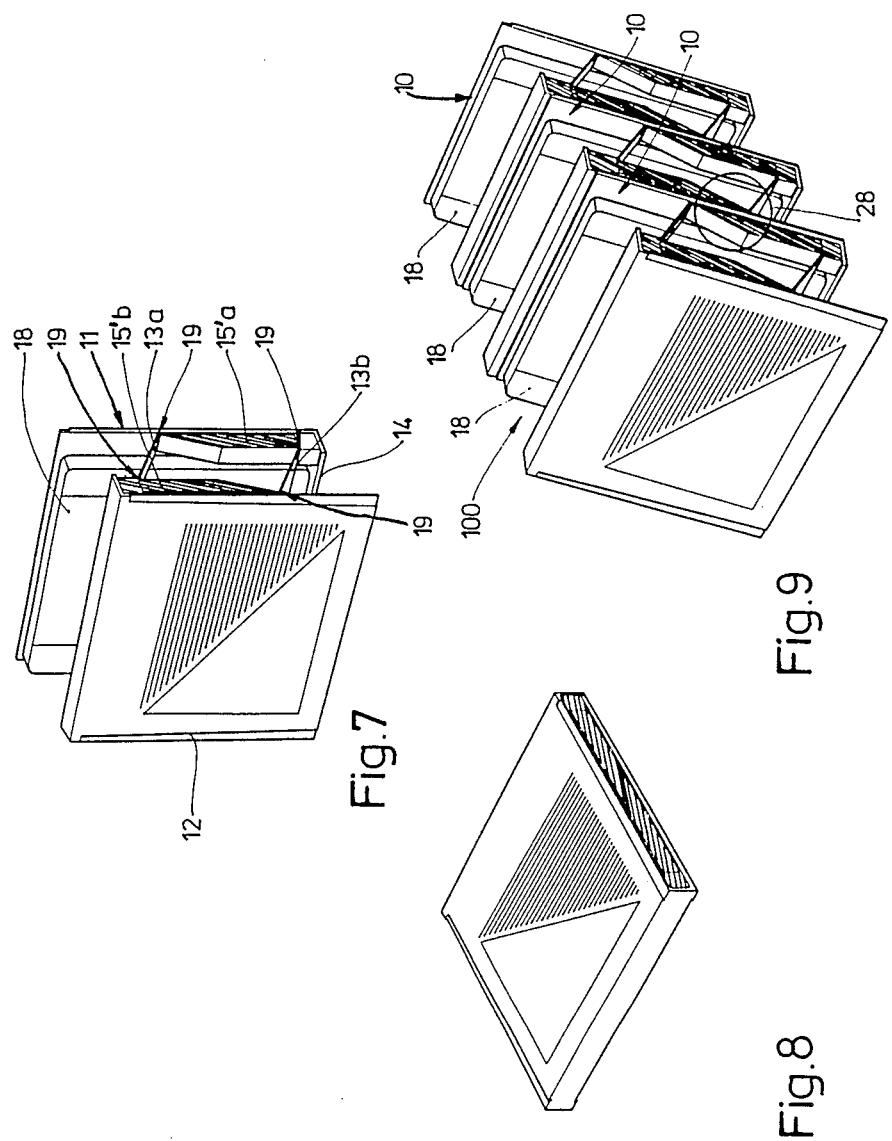

INDIVIDUAL CONTAINER THAT CAN BE ASSEMBLED TO A MULTIPLE STORAGE CONTAINER

BACKGROUND OF THE INVENTION

The present invention relates to an individual container that can be assembled to a multiple storage container, in particular a multiple filing box, for receiving plate-like objects or the like, according to the preamble of claim 1.

Multiple storage containers for flat, for example plate-like objects, have been previously known. If, for example, a total musical production consists of several records, these are delivered in cassettes, which are then packed separately in paper pockets and arranged in a common multiple storage container. Further, there has been known an arrangement where a multiple container composed of several flat individual containers or pockets is connected at its lower end, across all pockets, while the other end can be opened in the form of a rosette, in the manner one would open a chinese lantern, whereby the downwardly tapering pockets are opened and rendered accessible. However, such a container is connected with the disadvantage that only very thin objects, for example sheets of paper, can be arranged therein, while it is not suited for receiving, for example, boxes because these are uniform in thickness over their full height so that it would be impossible to close a rosette-like container of the described type if such boxes were stored therein.

It has also been known to arrange certain plate-like objects, for example so-called floppy discs for calculators or computers, in stacks and to file them in this manner. However, when a specific floppy disc is required to be used, then the whole stack of floppy discs or other storage means available—which may also consist of so-called CD-ROM boxes—must be looked through by hand, in the case of the conventional storage methods, because in order to read the labels and to select the required disc the container must be opened or in any case the other containers arranged on top thereof must be removed.

Now, it is the object of the present invention to provide an individual container for receiving plate-like objects of any desired type, in particular floppy discs or CD discs or CD-ROM boxes, which accordingly may themselves, as closed cassettes, present a box-like shape, which container enables the individual cassette or disc to be introduced in a simple manner, which forms simultaneously the packing, shipping and sales envelope for the plate-like object contained therein, and which finally can be assembled with other containers of the same type to provide an integral multiple filing box which in turn presents certain special properties, which are derived from certain properties of each the individual containers, i.e. mainly the property that the filing box can be opened by a pulling action by which all cassettes contained in the individual containers are rendered accessible simultaneously.

ADVANTAGES OF THE INVENTION

The invention achieves the before-mentioned objects by the characterizing features specified in claim 1 and offers the advantage that it provides individual containers which can be opened by gripping the box-like form of each individual container—whose thickness depends on the thickness of the plate-like objects or the cassette to be received therein—by their front and rear walls and pulling these two wall areas apart whereby the individual container is opened. The opening mechanism resembles that of a parallelogram due to the fact that elongated links extend along the lateral edges of the container. At least two connection links are provided on each side so that each container has at least four such links for forming the said parallelogram, the links being fixed to the front wall portion and to the rear wall portion of the individual container in such a manner that in the closed condition of the individual container the pivot points of the links are located at different heights. This makes it possible to move the front wall portion away from the rear wall portion, or vice versa, while maintaining the generally parallel arrangement of the two parts relative to each other, the maximum spacing between the two parts being determined by the length of the links or the greatest opening angle of the joints. Each of these individual containers, which forms an envelop for the part accommodated therein, is then simultaneously the protective or receiving pocket and at the same time the packing for the individual container and/or the object accommodated therein, which preferably may present the shape of a cassette, but may also be placed in the container without additional packing, as for example a CD disc or the like.

Advantageously, each of the described individual containers is designed in such a manner that it encloses the plate-like object or the cassette more or less fully, it being, however, understood that material-saving openings, recesses or the like may of course be provided in the front, side or rear walls provided the basic structure of each individual container remains unchanged. Each such individual container, which forms at the same time the selling, shipping or transport packing for the object accommodated therein, may be connected to each other individual container due to its particular configuration and by means of additional fixing means so that in each case a rear wall portion or a rear wall is connected flush with the front wall of the next following individual container.

It is thus possible to obtain a multiple storage container, for example a multiple filing box, by assembling a desired number of individual containers, whereby the advantageous properties of the individual container are transferred to the filing box, i.e. the whole filing box with all the individual containers contained therein can be pulled open in the form of a concertina, by gripping the filing box by its respective outer walls, i.e. the rear wall of the first individual container and the front wall of the last individual container, whereby all cassettes or objects get accessible simultaneously for inspection, removal, replacement, or any other desired action.

Other improvements and further developments of the invention are specified in the subclaims. The thickness of each individual container is, advantageously, only little greater than the thickness of the plate-like object, for example the diskette or CD disc or the latter's own container to be accommodated therein—all these objects will be described hereafter as cassette—so that space-saving storage means are provided by both, the individual containers and the multiple filing box assembled therefrom.

For the sake of a certain consistency in language, the object to be accommodated will be described hereafter only as CD disc or cassette, it being however understood that these two terms are not intended to restrict the application of the invention and that the individual containers or the multiple filing box assembled therefrom are capable of accommodating and storing, for rapid availability, any desired plate-like, i.e. flat objects, whether of circular, rectangular or of any other shape.

According to an advantageous further development of the invention, the mechanical connection between the front wall portion and the rear wall portion of each container is designed to provide at the same time guiding and retaining means for the cassette accommodated in the container. To this end, at least the two-part links arranged in the lower portion are provided with sort of retaining tongues which project inwardly and which due to their general shape ensure that a cassette accommodated in an individual container will not drop between the front wall portion and the rear wall portion when the latter are pulled apart, but will instead be held in contact with the rear wall and move downwardly together with the latter until it is caught by a projecting lower edge.

At the same time, these inwardly projecting retaining tongues may be designed in such a manner that the cassette accommodated in each individual container will not tilt when the latter is opened, i.e. will not in this tilted position follow the lifting movement, for example of the front wall portion, but will instead be retained in contact with the rear wall by the opening mechanism.

Finally, another advantageous further development of the present invention provides that locking means are arranged between the rear wall portion and the front wall portion of each individual container, for keeping the individual container in the closed position. In support of this arrangement, the links of the parallelogram guide may in addition be biased resiliently so that each individual container is safely retained in its closed position and/or will snap back into the closed position from the open position. The links are, therefore, advantageously formed as integral extensions of the plastic material from which the individual container is formed, and the joints or hinges at the transition points between the side walls and the links may be constituted by resiliently biased film hinges.

Accordingly, it is possible to produce the whole individual container as an integral plastic part; or else the side walls or certain areas thereof as well as the links connecting the side walls may be produced from a specific plastic material being well suited for producing film hinges of the described type, while the front and rear wall portions may be produced from another plastic material and then connected to the side walls, for example by bonding, simple pressing—in which case the rigid connection is established by corresponding fixing means—, by welding or the like.

The assembly of the individual containers to the described multiple filing box may be achieved by a plurality of snap or latching means, or by form-locking means. According to one embodiment of the invention, the marginal parts of the container are connected by U-shaped clips embracing two containers; another embodiment of the invention provides snap-connection or locking means on the adjacent faces of the rear and front walls, by which these two walls can be connected in a form-locking or force-locking manner; finally, it is also possible to join the adjacent wall faces of a front wall and a rear wall by dovetail-like connection means, in which case a slightly tapered design of the dovetail grooves provides an automatic locking effect in the end position. Finally, the connection by means of strip-off adhesive tapes is also imaginable.

BRIEF DESCRIPTION OF THE DRAWING

Certain embodiments of the invention will now be described in greater detail with reference to the drawing in which:

FIG. 1 shows a top view of a closed individual container accommodating another container indicated by broken lines;

FIG. 2 shows a side view of the individual container of FIG. 1;

FIG. 3 shows the same individual container as FIGS. 1 and 2, but in the open position, in which the rear wall portion and the front wall portion of the individual container are held in spaced position by the parallelogram-like guide formed by the two links on both sides of the container;

FIG. 4 shows a side view of two connected individual containers in the extended position of the filing box formed in this manner, in which both individual containers are open;

FIG. 5 is a diagrammatic front view of two connected individual containers, the connecting means being formed by dovetail-like structures at the marginal portions of the containers;

FIG. 6 shows an enlarged view of a locking lip at one upper bent-off side wall portion of a container which snaps behind a front wall or a rear wall of the container;

FIG. 7 shows an open, perspective view of an individual container with a cassette arranged therein;

FIG. 8 shows a perspective view of the same container in the closed position; while FIG. 9 shows a perspective view of three individual containers assembled to each other by their respective front or rear walls, in the extended open position, whereby a multiple filing box is formed;

DESCRIPTION OF THE EMBODIMENTS

Figure 10:
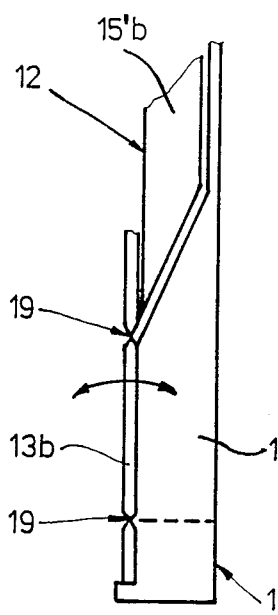
FIG. 10 shows an enlarged, diagrammatic partial side view, with certain parts left away, illustrating a lower connection link with joints on both ends in the form of film hinges.

It is the basic idea of the present invention that, for providing a multiple storage container, the respective individual containers intended for accommodating a plate-shaped object can be opened in such a manner that a rear wall portion is pulled away from the respective front wall portion of the individual container, but retained thereon by means of a parallelogram-like guide, and that the respective individual containers can be fitted and assembled to each other by their front and rear walls. This then provides the multiple storage container, which may be described also as multiple filing box, and to which the properties of each individual containers are transferred insofar as the whole filing box can be opened and closed by means of the respective parallelogram guides of the individual containers. The individual containers form at the same time the packing for the respective plate-like goods (cassette) and may be closed all-round. They can be stacked at a minimum of space by means of the connection means provided between them and form at the same time the common multiple filing box.

Each individual container 10 (cf. FIGS. 1, 2 and 3) consists of a rear wall portion 11 and a front wall portion 12. The two wall portions are interconnected by means of links 13a, 13b arranged laterally on their outsides. The links can be bent off in the form of joints at the points where they join the rear wall portion 11 and the front wall portion 12, which means that they are fixed to the latter in the form of hinges. Having preferably the same length, although this is not absolutely necessary, their hinge points are located at different heights in the closed condition of the container so that when the container is opened by means of the links 13a, 13b arranged on both sides of the respective individual container, sort of a parallel guide is obtained for the two front wall and rear wall portions which thereby move away from each other—a mechanism which resembles that of a parallelogram guide of the type known as such.

The greatest distance by which the front wall portion of each individual container can be spaced from the rear wall portion in the open condition of the container is approximately equal to the length of the links 13a, 13b (on both sides), it being understood that both the front wall portion and the rear wall portion may comprise other parts of the individual container, in addition to the rear wall and the front wall.

In the case of the preferred embodiment represented in the drawing, the rear wall 11 comprises, for example, in addition the lower marginal edge or the lower side wall 14 and at least certain portions of the two lateral side walls 15a, 15a', the latter being not shown in the representation of FIG. 3.

Correspondingly, in order to make the—preferably—fully enclosed container complete, the front wall portion 12 then comprises the upper marginal edge or upper side wall 16 and another portion of the lateral side walls, in this case the upper portion 15b, 15b'. It will be easily seen that by moving the front wall portion 12 in the direction indicated by arrow A the closing movement of the individual container 10 is effected until the closed position shown in FIG. 2 is reached in which the two lateral partial side walls 15a, 15b are in contact with each other along their inclined partition line 16, while the preferably thin, flat links 13a, 13b are in the retracted position in which they rest against the side wall surfaces 17 which are uncovered in the open condition of the container.

In the closed condition of the container, the upper marginal edge or side wall 16 also extends over the plate-like object or the cassette 18 placed in the container 10 covering and enclosing the cassette completely, so that each individual container 10 forms at the same time the packing and/or shipping or transport envelop for the cassette 18 in which the cassette is marketed and sold.

At the same time, the individual container 10 is part of a multiple filing box—an aspect which will be described in greater detail further below.

The opening and closing kinematics of each individual container 10, which resembles that of a double parallelogram guide, will be better understood when regarding the perspective representation of FIGS. 7, 8 and 9. FIG. 7 in particular shows very clearly that the respective parts 15a, 15a'; 15b, 15b' of the rear wall portion and/or the front wall portion have a certain thickness and serve as lateral guides for the cassette 18 which is placed in the rear wall portion 11 in the open condition of the container, the lower stop for the downwardly directed inserting movement of the cassette 18 being formed by the lower bent-off marginal edge or lower side wall 14 of the rear wall portion 11.

The two links, namely the upper link 13a and the lower link 13b may—as illustrated by the embodiment shown in the drawing—take the form of flat strips formed integrally with the lateral side wall portions 15a', 15b' and the joints between the links and the side wall portions may be constituted by integrally formed film hinges. According to a preferred embodiment of the invention, the film hinges are designed in such a manner that they present a pre-determined resilient restoring force which tends to return the individual container to its closed position, so that when the individual container has been opened and/or the whole multiple filing box, which consists of a corresponding number of individual containers, has been pulled open, the individual container or the multiple filing box has the tendency to close, or to return to its original position. Such biasing of the links may, if used, help maintain the closed condition of each individual container. According to an advantageous further improvement of the invention, this is also ensured by the fact that—as can be seen best in FIG. 6—the bent-off upper and/or lower marginal edges are provided with a downwardly projecting locking tongue 21 at least at a pre-determined point, approximately at its center at 20 (FIG. 1). In the fully closed position of the container, this tongue engages a corresponding opening or recess in the respective other wall portion and acts to keep the container closed, at a certain pre-stress, until the container is opened manually.

In this connection, it may be convenient, during production of an individual container, to produce the moving mechanism including the related side wall portions, for example the area encircled by the line 22 in FIG. 4, separately from a plastic material which is particularly well suited for the production of film hinges, for example by injection molding or in any other suitable manner, and to connect these parts later in a suitable manner to the remaining parts which may consist of any other plastic material, including a transparent material. This separate production of the parts ensuring the movement of the container is indicated by the transverse lines 23 on the lateral side walls 15a, 15b, 15a', 15b'. The connection to the remaining parts may be effected by conventional snap or latching mechanisms which need not be described here in greater detail, or else by gluing, welding or the like.

Figure 12:
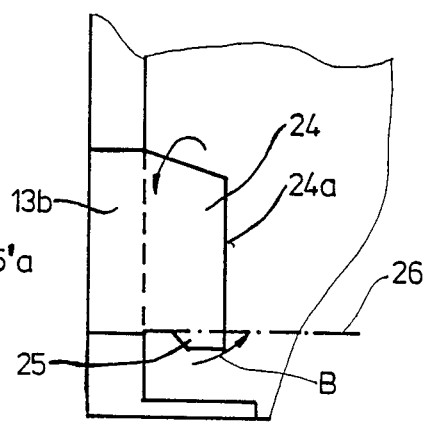
FIG. 12 shows a representation similar to FIG. 10, but turned by 90°, illustrating the inner guiding and retaining tongue arranged on the respective link and projecting inwardly, i.e. toward the cassette.

In order to prevent that in the open condition shown in fig. 3 or—for several individual containers—in FIG. 4 and in the perspective views of FIGS. 7 and 8, a container 18 may drop through the space between the rear wall portion and the front wall portion during insertion, for example due to carelessness or a rapid movement, the lateral side walls and/or the links 13a, 13b connected thereto or formed integrally therewith are additionally provided with inwardly projecting parts in the form of tongues or retaining means which are designated by reference numeral 24 in FIG. 12 and which will be described hereafter as retaining tongues. The retaining tongues 24, therefore, extend transversely to the links 13a, 13b and, in the case of the embodiment shown in FIGS. 10, 11 and 12, transversely to the lower link 13b.

While in principle it would also be possible to have the retaining tongues 24 extend right to the other side wall and its link, it is preferred to let them terminate at 24a because holding tongues 24 projecting inwardly from both sides in the transverse direction, starting out from the lower links 13b, form a satisfactory substitute for the front wall in the open condition of the container, until the front wall assumes the closed position.

FIG. 10 shows an enlarged representation of a detail of the side wall, comprising the lower side wall portion 15a' and the lower link 13b which is fixed to the latter via a film joint 19. At its upper end, the link 13b is connected via another film joint 19 to the upper side wall portion 15b' which in this case is part of the front wall 12.

Figure 11:
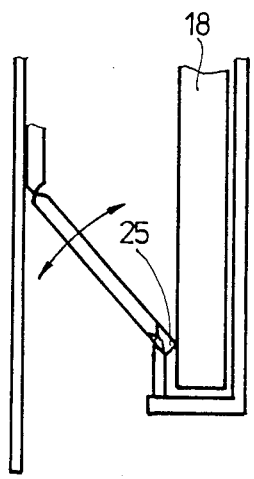
FIG. 11 shows the same view as FIG. 10 but in the open position of the container, with retaining and guiding means provided on the links acting upon the cassette received in the container.

The retaining tongue 24, which is, preferably, formed integrally with the link 13b, extends in this case vertically to the drawing plane, and it can be seen that in the closed condition of the container the retaining tongue 24 rests flush against the inner surface of the front wall, while in the open condition—shown in FIG. 11—the retaining tongue 24 forms a tapering chute by which a cassette 18 which is dropped into the container will necessarily be guided downwardly until it comes into contact with the lower end or side wall 14 and the rear wall.

Finally, in order to prevent the cassettes 18 from following the opening movement or the movement of the front wall away from the rear wall portion when the individual cassette and/or the cassettes as part of the multiple filing box are opened, i.e. from getting dislodged and, under certain circumstances, abutting against the upper side wall, whereby the opening movement may be blocked, the retaining tongues 24 are additionally provided with retaining projections or pressure parts serving to retain the cassette in its position at the rear wall. These projections will be described hereafter as retaining projections 25 and extend downwardly beyond the lower hinge or joint 19 so that during the opening movement of each individual container they will pivot inwardly, about the imaginary axis formed by the pivot point 19 and indicated by 26 in FIG. 2, and towards and against the cassette 18, as will be easily seen in the representation of FIG. 11, in conjunction with FIG. 12. This means that when the retaining tongue 24, at least the upper portion shown in FIG. 12, moves outwardly together with the front wall during opening of an individual container, whereby it gradually assumes an inclined position, up to the pivot axes 26, the lower retaining projection 25 turns inwardly in the direction indicated by arrow B and acts to retain the cassette 18 in contact with the rear wall and to prevent it from tilting.

It is understood that the individual components represented in the drawing derive their significance from their function, not so much from their shape which, when produced from a plastic material, for example by injection molding or other molding methods, may also exhibit other structures or forms. The present invention therefore also covers any such modifications or variations in shape, provided they fulfill the described functions within the scope of the invention. In particular, the retaining and fixing means, hinges, or the like, may be varied in any desired manner to suit best the requirements of the injection molding processes used.

It is further understood that, depending on the particular requirements and demands, larger parts, especially of the surfaces of the rear and front walls, may be left away, or openings or reinforcing ribs may be provided, just as, generally, the shape of the individual container must of course be adapted to the dimensions, size and depth of the respective goods to be accommodated, for example a CD disc with or without its own cassette, a CD-ROM box, or the like.

From the representation of FIG. 5 it further appears that there exist many different ways of interconnecting the respective individual containers. For example, the connection can be effected by U-shaped connection pins 27 which are inserted at different heights on both sides, bridging two cassettes. This can be seen best in the representation of FIG. 9, in the area of the inclined side wall surfaces encircled by the line 28.

Another possibility consists in providing corresponding retaining means formed by projections extending from one of the wall surfaces, or their marginal areas, and matching corresponding recesses in the other wall surface, so that the individual containers can be clicked or snapped in place, whereby a multiple filing box structure is obtained, depending on the number of the individual containers used.

Still another design of the connection between individual cassettes may consist of a dovetail-like structure as illustrated on both sides of FIG. 5, at 28. In this case, one surface of each individual container is provided with a dovetail-like projection, preferably in its marginal area, for engaging a dovetail-like recess in the other wall of the adjoining individual container. By sliding the respective surfaces carrying the dovetail-like structures along each other, until they assume their final positions, the two containers are firmly connected to and retained on each other. The dovetail structures may, preferably, be slightly conical, i.e. taper by only 1°, so that they provide not only a firm connection but only a safe automatic locking effect which makes the connection safe against unwanted detachment.

As can be seen best in FIG. 9, a multiple filing box composed in this manner and indicated by reference numeral 100 constitutes an ideal, space-saving storing means, especially for delicate goods, the individual containers, which are initially intended as packing for the individual goods, being in a position, due to their particular structure, to impart to the multiple filing box also the advantageous properties which can be provided by the different multiple storage container specified by the before-mentioned Utility Patent No. G 86 02 838.3 and which have been described in detail with reference to the latter.

By pulling the multiple filing box so formed open, all individual containers of the box are opened, whereby the cassettes accommodated therein are rendered accessible for rapid inspection and selection. At the same time, the arrangement enables the cassettes to be stored in a space-saving manner, since the dimensions of the filing box are drastically reduced in the closed condition. Further, it is ensured that none of the individual containers is thrown around, may get lost or that the filing system may get into disorder by different stacking methods.

All features mentioned or shown in the above description, the following claims and the drawing may be essential to the invention either alone or in any combination thereof.

I claim:

1. Individual container that can be assembled to a multiple storage container, in particular a multiple filing box, for receiving plate-like objects, for example storage means in the form of sound or data carriers (CD disks, floppy disks, CD ROM boxes) or the like, which may be additionally accommodated in a protective housing (cassette), characterized in that the front wall (12) and the rear wall (11) of each individual container (10) are laterally connected by hinged links (13a, 13b) provided on both sides and acting in the manner of a parallelogram guide, so that the respective individual container (10) can be opened by a pulling action, and that coacting fixing means (27, 28) are provided on the outwardly directed faces of the front and the rear wall for connecting one outer rear wall face to the adjacent front wall face of the following individual container (10), or vice versa.

2. Individual container that can be assembled to a multiple storage container according to claim 1, characterized in that due to the parallelogram-like opening structure of each individual container, the multiple storage container as a whole can be pulled open in the manner of a concertina, with the individual compartments accommodating plate-like objects or cassettes (18) remaining interconnected by upper and lower links (13a, 13b) arranged on both sides of the containers.

3. Individual container that can be assembled to a multiple storage container according to claim 1, characterized in that at least parts of the lateral side walls (15a, 15b, 15a', 15b') are arranged at the front wall and/or rear wall (11, 12) and that the lateral wall portions (15a, 15b; 15a', 15b') carry the joints which constitute the connection to the links (13a, 13b) interconnecting the front wall and the rear wall portion of the container in the manner of a parallelogram guide, for carrying out an opening and closing movement.

4. Individual container that can be assembled to a multiple storage container according to claim 3, characterized in that the front wall (12) and the rear wall (11) present to each other a reverse L shape, which means that they comprise an integrally formed upper or lower side wall (14, 16), respectively.

5. Individual container that can be assembled to a multiple storage container according to claim 4, characterized in that the two lateral side walls are separated by an inclined transition, and are composed by a lower part (15a, 15a') which is connected completely to a lower wall portion (rear wall 11), maybe even formed integrally therewith, and another lateral wall portion (15b, 15b'), which is connected completely to the other wall portion (front wall 12), maybe even formed integrally therewith, and that the links (13a, 13b) extend at different heights from the lateral side wall portions (15a, 15a', 15b, 15b'), forming film hinges serving as joints, and end in the respective other part, all in mirror-inverted arrangement.

6. Individual container that can be assembled to a multiple storage container according to claim 1, characterized in that the links (13a, 13b) are constituted by flat strips being integrally formed and hinged at the respective connection points in the manner of a film joint, with a certain bias acting in the closing direction of each individual container.

7. Individual container that can be assembled to a multiple storage container according to claim 1, characterized in that each individual container (10) is provided with retaining and/or locking means (21) securing the closed position.

8. Individual container that can be assembled to a multiple storage container according to claim 7, characterized in that the retaining or locking means, which are effective in the closed position of each individual container, consist of a tongue-shaped projection (21) provided at the lower or upper side wall and a corresponding recess which is engaged by the said projection (21).

9. Individual container that can be assembled to a multiple storage container according to claim 1, characterized in that inwardly directed guiding means are arranged on the upwardly open rear wall 11, forming sort of a chute for guiding a cassette (18) during its introduction into the intended final position and for retaining it in contact with the rear wall portion.

10. Individual container that can be assembled to a multiple storage container according to claim 9, characterized in that the guiding means are formed by retaining tongues (24) attached to the links (13a, 13b) and extending transversely and inwardly therefrom, which retaining tongues (24) form a chute-like guide for the cassette (18) in the open condition of the individual container.

11. Individual container that can be assembled to a multiple storage container according to claim 10, characterized in that the retaining tongues (24), which during opening of the individual container can be pivoted outwardly about the pivot point of the links, are provided with downwardly directed retaining projections (25) which during opening of the container are progressively moved towards the cassette (18), and in contact therewith, so as to prevent it from tilting and to retain it safely in contact with the rear wall surface.

12. Individual container that can be assembled to a multiple storage container according to claim 1, characterized in that the fixing means provided on each individual container consist of openings in the side wall for receiving U-shaped connection bridges (67).

13. Individual container that can be assembled to a multiple storage container according to claim 1, characterized in that the fixing means consist of retaining and/or locking lugs provided on one of the wall faces and matching receiving openings or marginal edges provided on the other, adjoining surface of the next individual container, so that the individual containers can be assembled to a multiple filing box by a snap-in movement.

14. Individual container that can be assembled to a multiple storage container according to claim 1, characterized in that the front wall and the rear wall of each individual container are provided with complementary dovetail structures (dovetail and dovetail groove, respectively) so that the individual containers can be assembled to a multiple filing box by sliding one of the individual containers upon another one, until it assumes the flush final position.

15. Individual container that can be assembled to a multiple storage container according to claim 14, characterized in that the dovetail structure provided on the front and rear surfaces of each individual container is slightly conical (tapering by approx. 1°) so that an automatic locking effect is obtained as the containers are pushed into their final position.

* * * * *